ns011660781B2

(12) United States Patent
Jernei et al.

(10) Patent No.: US 11,660,781 B2
(45) Date of Patent: May 30, 2023

(54) SYSTEM FOR PROVIDING BUILDING MATERIALS INCLUDING A LIFTING DEVICE

(71) Applicant: SIKA TECHNOLOGY AG, Baar (CH)

(72) Inventors: Michael Jernei, Bludenz (AT); Reto Kuster, Nottwil (CH)

(73) Assignee: SIKA TECHNOLOGY AG, Baar (CH)

( * ) Notice: Subject to any disclaimer, the term of this patent is extended or adjusted under 35 U.S.C. 154(b) by 160 days.

(21) Appl. No.: 16/982,101

(22) PCT Filed: Mar. 21, 2019

(86) PCT No.: PCT/EP2019/057077
§ 371 (c)(1),
(2) Date: Sep. 18, 2020

(87) PCT Pub. No.: WO2019/180135
PCT Pub. Date: Sep. 26, 2019

(65) Prior Publication Data
US 2021/0008761 A1 Jan. 14, 2021

(30) Foreign Application Priority Data

Mar. 21, 2018 (EP) .................................... 18163024

(51) Int. Cl.
*B28C 7/06* (2006.01)
*B28C 7/00* (2006.01)
(Continued)

(52) U.S. Cl.
CPC .............. *B28C 7/064* (2013.01); *B01F 23/59* (2022.01); *B01F 35/7173* (2022.01);
(Continued)

(58) Field of Classification Search
CPC ....... B28C 7/064; B28C 7/0076; B28C 7/068; B01F 23/59; B01F 35/7173;
(Continued)

(56) References Cited

U.S. PATENT DOCUMENTS 2,928,561 A * 3/1960 Faure .................... B28C 7/0841
366/26
3,018,880 A * 1/1962 Brugmann ......... B65D 88/1618
206/568

(Continued)

FOREIGN PATENT DOCUMENTS

DE 202 09 351 U1 9/2002
DE 102005011813 A1 * 9/2006 ............... B65B 1/16
(Continued)

OTHER PUBLICATIONS

Machine translation of EP 1321262 A1 Jun. 2003.*
(Continued)

*Primary Examiner* — Charles Cooley
(74) *Attorney, Agent, or Firm* — Oliff PLC

(57) ABSTRACT

A system provides building materials including a packaging, a lifting device and a mixing and conveying device. The packaging can be positioned by the lifting device via the mixing and conveying device in such a way that a total height of the system is less than 230 cm.

10 Claims, 3 Drawing Sheets

(51) Int. Cl.
*B65D 88/16* (2006.01)
*C04B 40/00* (2006.01)
*B01F 23/50* (2022.01)
*B01F 35/71* (2022.01)
*B01F 101/28* (2022.01)

(52) U.S. Cl.
CPC ............ *B28C 7/0076* (2013.01); *B28C 7/068* (2013.01); *B65D 88/1681* (2013.01); *C04B 40/0042* (2013.01); *B01F 2101/28* (2022.01)

(58) Field of Classification Search
CPC .. B01F 2101/28; B01F 23/50; B65D 88/1681; B65D 88/1675; B65D 88/1687; C04B 40/0042
USPC .......................................................... 366/26
See application file for complete search history.

(56) References Cited

U.S. PATENT DOCUMENTS

| | | | | |
|---|---|---|---|---|
| 3,279,763 | A * | 10/1966 | Seman | B28C 7/068 366/39 |
| 4,300,608 | A * | 11/1981 | Cuthbertson | B65D 88/1687 383/7 |
| 4,953,752 | A * | 9/1990 | Tousignant | B28C 7/064 222/196 |
| 4,997,284 | A * | 3/1991 | Tousignant | B28C 7/064 366/14 |
| 5,184,759 | A * | 2/1993 | Gill | B65D 90/205 222/529 |
| 5,257,725 | A * | 11/1993 | Volk, Jr. | B65B 69/0091 222/203 |
| 5,415,323 | A * | 5/1995 | Fenelon | B65B 69/0083 414/404 |
| 5,810,478 | A * | 9/1998 | LaFleur | B65D 88/1618 383/41 |
| 10,479,599 | B2 * | 11/2019 | Dunlap | B65D 88/1668 |
| 10,486,579 | B2 * | 11/2019 | O'Neill | B65D 88/1687 |
| 11,104,510 | B2 * | 8/2021 | O'Neill | B66F 9/125 |
| 11,319,144 | B1 * | 5/2022 | Dunlap | B31D 5/0034 |
| 2009/0177313 | A1 * | 7/2009 | Heller | B28C 9/049 700/214 |
| 2010/0118640 | A1 * | 5/2010 | Matye | B28C 9/04 366/41 |
| 2012/0230147 | A1 * | 9/2012 | Heller | B28C 7/064 366/141 |
| 2015/0165393 | A1 * | 6/2015 | Schuster | B28C 7/12 366/1 |
| 2018/0050863 | A1 * | 2/2018 | Dunlap | B65D 88/1668 |
| 2018/0118451 | A1 * | 5/2018 | Dunlap | B65D 88/1668 |
| 2018/0126661 | A1 * | 5/2018 | Dunlap | B29C 66/83221 |

FOREIGN PATENT DOCUMENTS

| | | | | |
|---|---|---|---|---|
| DE | 202012101568 U1 * | 6/2013 | ........ | B01F 15/00058 |
| EP | 0340622 A2 * | 11/1989 | | |
| EP | 1 321 262 A1 | 6/2003 | | |
| FR | 2352920 | * 1/1978 | | |
| FR | 2832349 A1 * | 5/2003 | .......... | B01F 15/0235 |
| FR | 2848139 A1 * | 6/2004 | ............. | B28C 7/068 |
| FR | 2914291 A1 * | 10/2008 | .......... | B28C 7/0404 |
| RU | 2 593 830 C2 | 8/2016 | | |
| WO | WO-2019180135 A1 * | 9/2019 | .......... | B01F 15/0234 |

OTHER PUBLICATIONS

Machine translation of DE 2020935 U1 Sep. 2002.*
Machine translation of FR 2914291 A1 Oct. 2008.*
Jun. 27, 2019 International Search Report issued in International Patent Application No. PCT/EP2019/057077.
Sep. 22, 2020 International Preliminary Report on Patentability issued in International Patent Application No. PCT/EP2019/057077.

* cited by examiner

SYSTEM FOR PROVIDING BUILDING MATERIALS INCLUDING A LIFTING DEVICE

The present invention relates to a system for providing building materials, and to a packaging for use in such a system.

Various systems are used to provide building materials, e.g. mortar. Often, sacks containing a dry cement mixture, for example, are emptied by hand into a mixer, where the mortar is then prepared by the addition of water. This has the advantage that it is possible to work with low costs since only a few machines are necessary and simple logistics are sufficient. The disadvantage with this, on the other hand, is that a large amount of manual work is necessary and that relatively severe dust pollution often arises. Moreover, the amount of building material that can be provided with such systems per unit time is generally small.

Another known system for providing building materials, e.g. mortar, is the use of silos. Silos have the advantage that large quantities of building materials can be provided in this case with the expenditure of relatively little manual work. The disadvantage, however, is that large investments in the silos, on the one hand, and in a dense network of distribution centers for the silos, on the other hand, are necessary. Moreover, the refilling of such silos is expensive and complex. In addition, there is the fact that, owing to their height, such silos can only be set up in sheds or outside a building.

It is thus one object of the present invention to make available a high-performance system for the provision of building materials which requires little manual work, which allows logistics that are reduced as far as possible, and which as far as possible avoids dust production in use. Moreover, the system should allow flexible and low cost use in various types of application.

This object is achieved by a system for providing building materials, the system comprising: a packaging with a first component arranged therein, wherein the packaging comprises a sleeve and a hanging device; a lifting device, wherein the packaging can be connected operatively, at the hanging device thereof, to the lifting device and moved through space by said lifting device; a second component; and a mixing and conveying device, in which the first component can be mixed with the second component and by means of which the building material can be conveyed; wherein the packaging with the first component can be positioned over the mixing and conveying device by the lifting device in such a way that a total height of the system is less than 230 cm.

The solution proposed here first of all offers the advantage that it can also be employed in low-height spaces such as garages or houses. Moreover, manual work is reduced by the use of a lifting device. Furthermore, dust pollution can be greatly reduced by the positioning of the packaging over the mixing and conveying device by means of the lifting device.

It is a core concept of the present invention to use a flexible modular system which manages with a very low expenditure of manual work. Through the use of corresponding packagings and of a corresponding mixing and conveying device, it is nevertheless possible to achieve a high flow rate of the building material. It is thus possible by simple means to provide a very effective system for providing building materials.

In one illustrative embodiment, the first component is a dry product or a dry mixture, and the second component is a liquid product or a liquid mixture.

In one illustrative embodiment, the building material is mortar, in particular masonry mortar, plaster mortar, fireproofing mortar, mortar with synthetic resin dispersion, grouting mortar, wet mix mortar, self-leveling filler, jointing mortar, screed mortar, or hydraulic mortar.

In one illustrative embodiment, the first component comprises cement, more particularly cement based on binder comprising Portland cement, gypsum, lime, high-alumina cement or sulfoaluminate cement.

In one illustrative embodiment, the second component comprises water or mixing water, more particularly water containing additives such as accelerators or retarders or polymeric modifiers.

Illustrative accelerators are accelerators based on calcium nitrates, aluminates, aluminum sulfates or ethanolamines.

Illustrative retarders are retarders comprising phosphates or gluconates

Illustrative polymeric modifiers comprise styrene-butadiene dispersions or styrene-acrylate dispersions.

These additives can be admixed continuously or discontinuously to the water or mixing water via a bypass.

In one illustrative embodiment, a filling level of the first component is between 0.6 and 0.95 of the height of the sleeve of the packaging, preferably between 0.65 and 0.85, particularly preferably between 0.7 and 0.8.

The provision of such a filling level has the advantage that, as a result, an uppermost region of the sleeve remains empty and flexible, with the result that a connection between the hanging device, attached in this uppermost region of the sleeve, and the lifting device can be established more easily.

In one illustrative embodiment, the lifting device is a forklift truck or a pallet truck, in particular an electric high-lift truck.

The use of a forklift truck as a lifting device offers the advantage that it is thereby possible to move packagings of a size typical for the application efficiently in space. Moreover, forklift trucks are often available on construction sites, and therefore no special lifting devices have to be transported to the location of use for the system proposed here. Forklift trucks furthermore offer the advantage that the packaging can thereby be positioned directly over the mixing and conveying device without the need for large crane-type machines in the process.

In one advantageous embodiment, the lifting device comprises an inverted fork, thus enabling the hanging device to be hung on a highest region of the fork.

The use of an inverted fork offers the advantage that the packaging can thereby be raised to the necessary height without the lifting device projecting beyond this necessary height in the process. In other words, the packaging can thereby be hung on a highest region of the lifting device. This allows a total height of the system proposed here to be as small as possible.

In one illustrative embodiment, the inverted fork comprises four arms, wherein a respective loop of the hanging device of the packaging can be hung on each one of the arms.

In one illustrative development, the arms of the fork are spaced somewhat further apart than the loops of the hanging device. As a result, the packaging tends to be pulled apart slightly in the direction of its width and depth.

Such a fork with four arms has the advantage that, when picking up a new packaging, the lifting device can be brought up to the hanging device of the packaging substantially from above. Once the fork has been positioned next to the loops of the hanging device from above, the loops can be placed over the arms of the fork without the need to move the lifting device during this process, either horizontally or vertically. This significantly facilitates the handling of packagings by the lifting device, thus enabling this process to be carried out readily and efficiently by one person. Particularly in confined spaces, this is advantageous because little space is required for maneuvering.

In one illustrative embodiment, forks of the lifting device have a diameter of between 5 and 20 cm, preferably between 5 and 15 cm, particularly preferably between 7 and 13 cm.

In one illustrative embodiment, the forks of the lifting device have a substantially round or circular or oval cross section.

In one illustrative embodiment, hanging locations of the forks of the lifting device have a spacing of between 60 and 120 cm, preferably between 70 and 110 cm, preferably between 80 and 100 cm, particularly preferably between 85 and 95 cm.

In one illustrative embodiment, the fork is connected detachably to the lifting device, e.g. by means of a retention mechanism which can be opened and closed by a lever. This has the advantage that, as a result, the lifting device can be used with various attachments for various purposes.

In one alternative embodiment, the fork is connected in a fixed manner to the lifting device, e.g. by screwed joints. This is advantageous when the lifting device is to be used for a particular purpose over a relatively long period of time.

In one illustrative embodiment, the mixing and conveying device is a single unit.

For example, the mixing and conveying device can have a hopper, into which the first component can be introduced from the packaging, and which feeds the first component to a mixing region or to a mixing chamber. The mixing region or mixing chamber can be embodied as a dynamic rod mixer, for example.

A feed screw can be used to convey the mix, for example.

Examples of mixing and conveying devices can be obtained under the trade name Mai4Ever light from Mai International GmbH, Feistritz/Drau, Austria, or Inotec ino-COMB Picco Power from Inotec GmbH, Waldshut-Tiengen, Germany.

In one alternative exemplary embodiment, the mixing and conveying device is designed as two separate units. In this case, a first unit is provided for mixing the first component with the second component, and a second unit is provided for conveying the mix.

In one preferred embodiment, a total height of the system is less than 225 cm, or less than 220 cm, or less than 215 cm, or less than 210 cm, or less than 205 cm, or less than 200 cm.

In one illustrative embodiment, a height of the mixing and conveying device is between 70 and 150 cm, preferably between 80 and 140 cm, particularly preferably between 90 and 130 cm, particularly preferably between 90 and 120 cm.

A packaging for use in the system described above is furthermore proposed here, wherein the sleeve of the packaging has a standing surface, lateral surfaces and a top surface, wherein the sleeve has an emptying device in the standing surface, and wherein the sleeve has a filling device in the top surface.

In one illustrative embodiment, the sleeve is substantially cuboidal or cylindrical.

Cuboidal or cylindrical sleeves have the advantage that the packaging is better for stacking as a result.

In one illustrative embodiment, a ratio of a height of the sleeve, on the one hand, to a width and/or depth of the sleeve, on the other hand, is between 0.5 and 1.0, preferably between 0.6 and 0.9, particularly preferably between 0.65 and 0.85, in an empty state.

The provision of such sleeves which have a greater width and/or depth than a height in the empty state has the advantage that the packagings have a small height in relation to their volume, and therefore an overall height of the system is as small as possible.

In one illustrative embodiment, a height of the sleeve in an empty state is between 50 and 100 cm, preferably between 60 and 90 cm, particularly preferably between 65 and 85 cm.

In one illustrative embodiment, a width and/or a depth of the sleeve in an empty state is between 60 and 110 cm, preferably between 70 and 100 cm, particularly preferably between 80 and 100 cm.

In a filled state, i.e. when the first component in the packaging is arranged therein, the height of the sleeve in comparison with the empty state typically decreases, and the width and/or depth of the sleeve increases in comparison with the empty state.

According to a test, a sleeve which has a height of 78 cm and a width and depth of 88 cm in the empty state has a height of just 55 cm and a width and depth of 113 cm when filled with 1000 kg of dry mortar.

In one illustrative embodiment, the sleeve has a lining.

In one illustrative development, the lining comprises a plastic in the form of a film.

In one illustrative development, the plastic in the form of a film comprises polypropylene or polyethylene.

In one illustrative embodiment, the lining is adhesively bonded to the sleeve, at least at some points.

In one illustrative development, the sleeve is adhesively bonded to the lining in at least 10% or at least 20% or at least 30% or at least 40% of a surface area of the lining.

In one illustrative development, the sleeve is adhesively bonded to the lining in at most 90% or at most 80% or at most 70% or at most 60% of a surface area of the lining.

The provision of such a lining in the sleeve has the advantage that, as a result, on the one hand, the first component can be better protected from moisture or other environmental influences and that, on the other hand, a more dimensionally stable packaging can be achieved. This is advantageous particularly because, as a result, the height of the packaging is not significantly extended when hung on the lifting device. This has the effect that the overall system has a total height which is as small as possible.

In one illustrative embodiment, the hanging device comprises loops which are arranged in an upper region of the lateral surface.

In one illustrative embodiment, the hanging device comprises four loops

In one illustrative embodiment, a fixing region of the loops on the sleeve is at a distance of 5 to 30 cm, preferably 5 to 25 cm, particularly preferably 10 to 20 cm, from an upper edge of the lateral surfaces.

Moving the fixing regions of the loops slightly downward on the sleeve has the advantage that it is thereby possible, in turn, to achieve a packaging which is as compact as possible in respect of its vertical extent.

Details and advantages of the invention are described below by means of exemplary embodiments and with reference to schematic drawings.

Figure 1:
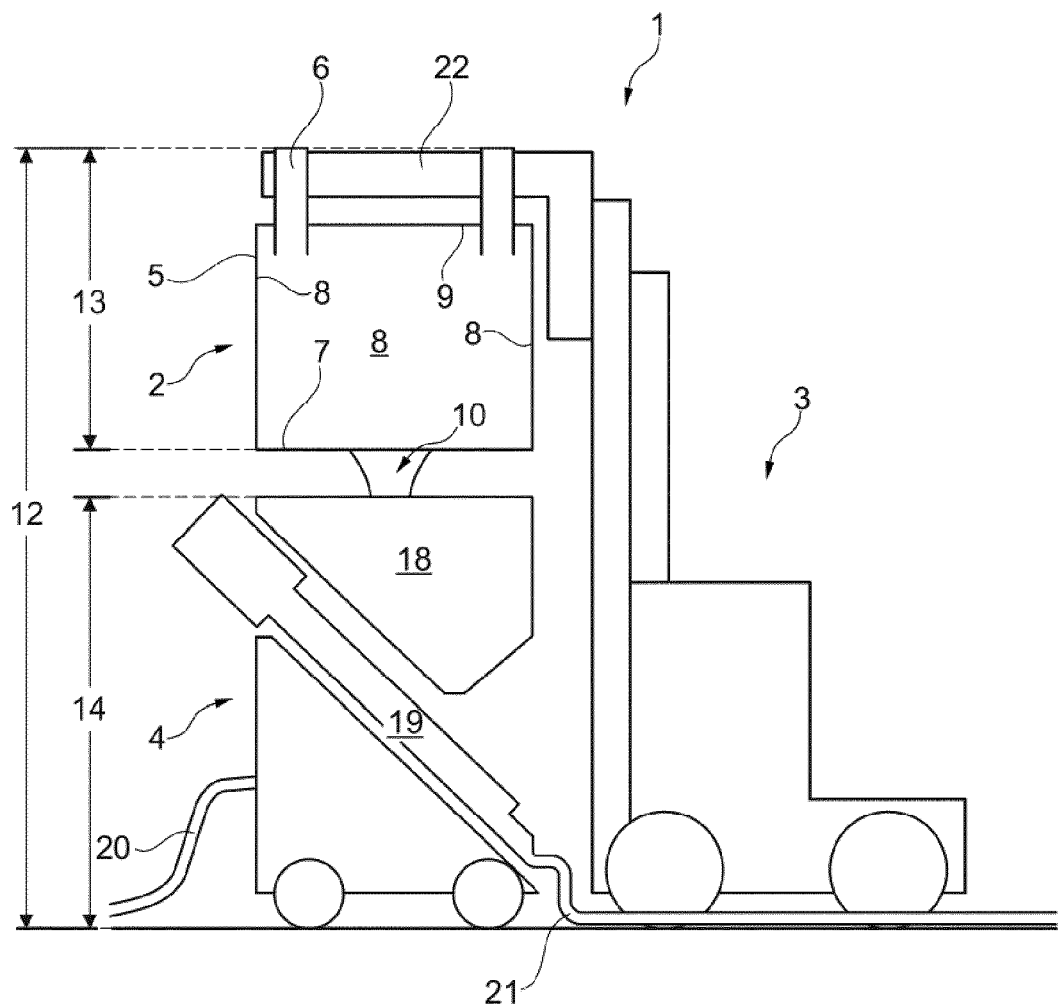
FIG. 1 shows a schematic illustration of a system for providing building materials in side view.

FIG. 1 illustrates an illustrative and schematically illustrated system 1 for providing building materials. The system 1 comprises a packaging 2, a lifting device 3, and a mixing and conveying device 4.

In this exemplary embodiment, the packaging 2 is formed with a sleeve 5 and with a hanging device 6, wherein the sleeve 5 has a substantially cuboidal shape. Here, the sleeve 5 has a standing surface 7, lateral surfaces 8 and a top surface 9. Arranged in the standing surface 7 is an emptying device 10, and a filling device (not visible in this illustration) is provided in the top surface 9. In this case, the packaging 2 has a total height 13. In this exemplary embodiment, the total height 13 of the packaging 2 extends from the standing surface 7 to an uppermost region of the hanging device 6.

In this exemplary embodiment, the lifting device 3 is embodied as a forklift truck. In this case, the lifting device 3 comprises an inverted fork 22. This inverted fork 22 has a tubular cross section, for example, with the result that the hanging device 6, which in this exemplary embodiment is designed as loops, can be operatively connected in a simple manner to the fork 22 of the lifting device 3.

Through the use of an inverted fork 22, the hanging device 6 of the packaging 2 can be hung on an uppermost region of the fork 22 and also of the lifting device 3.

In this exemplary embodiment, the mixing and conveying device 4 is designed as a single machine. In this case, the mixing and conveying device 4 comprises a hopper 18, or a mixing chamber 19, a feed line 20 and a discharge line 21. In this case, the first component is fed to the mixing chamber 19 from the packaging 2 via the hopper 18. With the addition of the second component via the feed line 20, the first component is mixed with the second component in the mixing chamber 19 and is then discharged from the mixing and conveying device 4 via the discharge line 21.

With such a system 1 it is possible, by using a dry cement mixture as the first component and water as the second component for example, to provide mortar. At the same time, this system 1 requires little manual intervention, has a high flow rate, and can also be used in spaces with a height of 230 cm.

Figure 2:
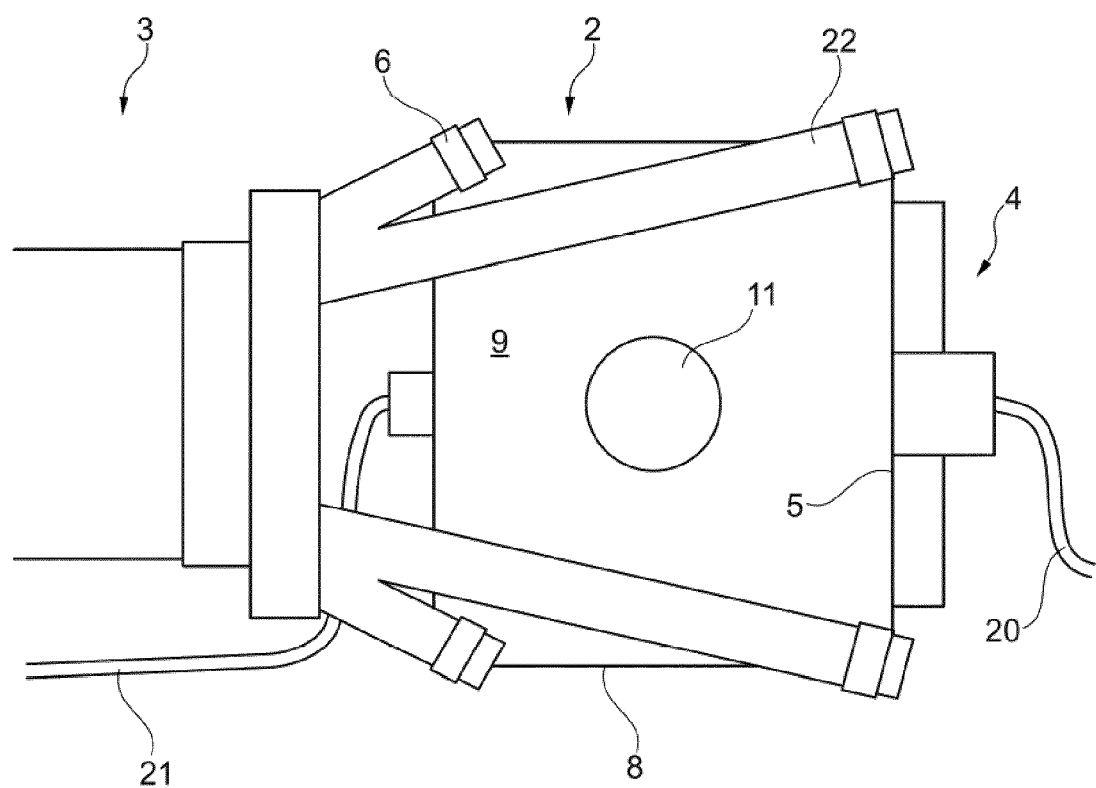
FIG. 2 shows a schematic illustration of a system for providing building materials in plan view.

An illustrative system 1 for providing building materials is illustrated schematically in plan view in FIG. 2. In this illustrative embodiment, the inverted fork 22 comprises four arms, wherein a respective loop of the hanging device 6 of the packaging 2 can be hung on each one of the arms. Here, the arms of the fork 22 are designed in such a way that the packaging 2 as far as possible retains its shape and is not extended in length by the weight of the first component. This can be achieved, in particular, if the respective hanging locations on the arms of the fork 22 are spaced somewhat further apart than the loops of the hanging device 6, with the result that the packaging 2 tends to be pulled apart slightly in the direction of its width and depth.

Such a fork 22 with four arms has the advantage that, when picking up a new packaging 2, the lifting device 3 can be brought up to the hanging device 6 of the packaging 2 substantially from above. Once the fork 22 has been positioned next to the loops of the hanging device 6 from above, the loops can be placed over the arms of the fork 22 without the need to move the lifting device 3 during this process, either horizontally or vertically. This significantly facilitates the handling of packagings 2 by the lifting device 3, thus enabling this process to be carried out readily and efficiently by one person. Particularly in confined spaces, this is advantageous because little space is required for maneuvering.

Figures 3A, 3B:
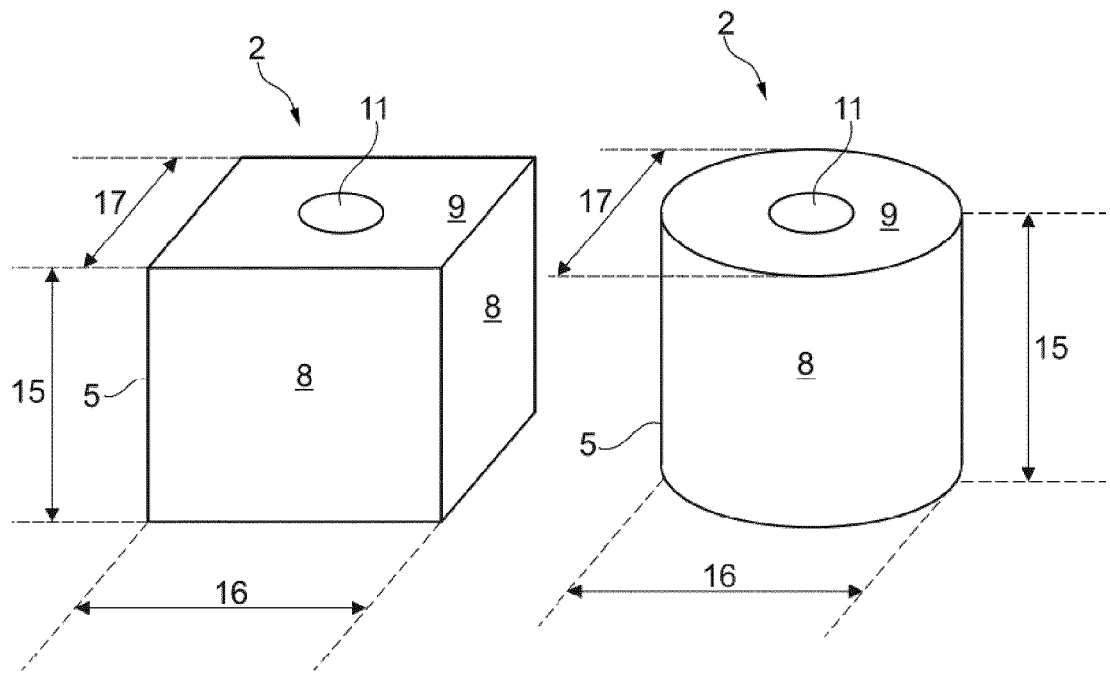
FIGS. 3a and 3b show schematic illustrations of a packaging.

Two different packagings 2 are illustrated schematically in FIGS. 3a and 3b. Here, the packaging 2 in FIG. 3a is of cuboidal design, and the packaging 2 in FIG. 3b is of cylindrical design. The packagings 2 each have a top surface 9 having a filling device 11, lateral walls 8 and a standing surface having an emptying device (not visible in this illustration). Here, the packagings 2 have a sleeve width 16, a sleeve height 15 and a sleeve depth 17.

Figure 4:
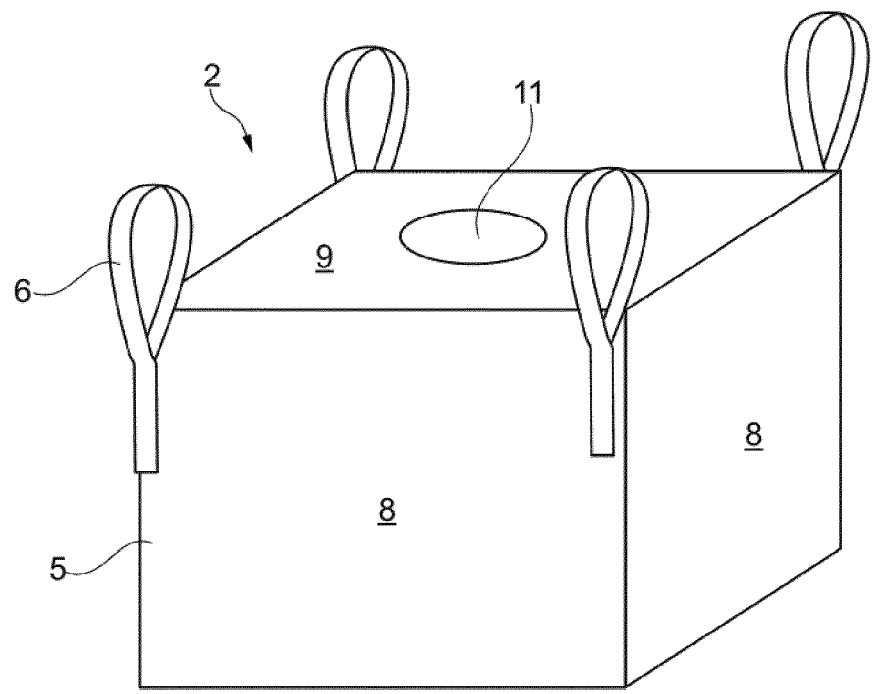
FIG. 4 shows a schematic illustration of an illustrative packaging.

A packaging 2 having a sleeve or cover 5 and a hanging or suspension device 6 is illustrated in FIG. 4. The hanging or suspension device 6 in this exemplary embodiment comprises four loops, which are each arranged in one upper region of the sleeve or cover 5 and are each arranged in the region of the edges between two lateral surfaces 8. In order to keep a total height of the packaging 2 as small as possible, a fixing region of the hanging or suspension devices 6 on the sleeve or cover 5 is spaced apart from an upper edge of the lateral surface by a certain distance.

LIST OF REFERENCE SIGNS

1 System
2 Packaging
3 Lifting device
4 Mixing and conveying device
5 Sleeve
6 Hanging device
7 Standing surface
8 Lateral surface
9 Top surface
10 Emptying device
11 Filling device
12 Total height of the system
13 Total height of the packaging
14 Height of the mixing and conveying device
15 Sleeve height
16 Sleeve width
17 Sleeve depth
18 Hopper
19 Mixing chamber
20 Feed line
21 Discharge line
22 Inverted fork

The invention claimed is:

1. A system for providing a building material, the system comprising:
    a packaging with a first component arranged therein, the packaging comprising a cover and a suspension device, the cover having a standing surface, at least one side surface, and a top surface, the suspension device comprising loops which are arranged in an upper area of the at least one side surface, and an area of attachment of the loops to the cover is spaced from an upper edge of the at least one side surface by a distance in a range of 5 to 30 cm;
    an emptying device formed in the standing surface;
    a filling device formed in the top surface;
    a lifting device configured to operatively connect to the suspension device of the packaging and to displace the packaging in space; and
    a mixing and conveying device configured to mix the first component with a second component to form the building material and to convey the building material therethrough, wherein the lifting device is configured to position the packaging with the first component over the mixing and conveying device such that a total height of the system is less than 230 cm.

2. The system as claimed in claim 1, wherein the first component is a dry product or a dry mixture, and the second component is a liquid product or a liquid mixture.

3. The system as claimed in claim 2, wherein the first component comprises cement and the second component comprises water such that mortar is obtained as the building material.

4. The system as claimed in claim 1, wherein the lifting device comprises an inverted fork, and the suspension device is configured to be hung on a highest region of the fork.

5. The system as claimed in claim 1, wherein the lifting device is a forklift truck or a pallet truck.

6. The system as claimed in claim 1, wherein the cover is substantially cuboidal or cylindrical.

7. The system as claimed in claim 1, wherein a ratio of a cover height to at least one of a cover width and a cover depth is between 0.6 and 1.0.

8. The system as claimed in claim 1, wherein a cover height is between 50 and 100 cm, and at least one of a cover width and a cover depth is between 60 and 110 cm.

9. The system as claimed in claim 1, wherein the cover has a lining.

10. The system as claimed in claim 9, wherein at least one of (i) the lining comprises a plastic film, and (ii) the lining is at least partially adhesively bonded to the cover.

\* \* \* \* \*